Feb. 9, 1954
W. L. SHIMMON
2,668,488
VINEYARD PLOW
Filed March 14, 1951
2 Sheets-Sheet 2
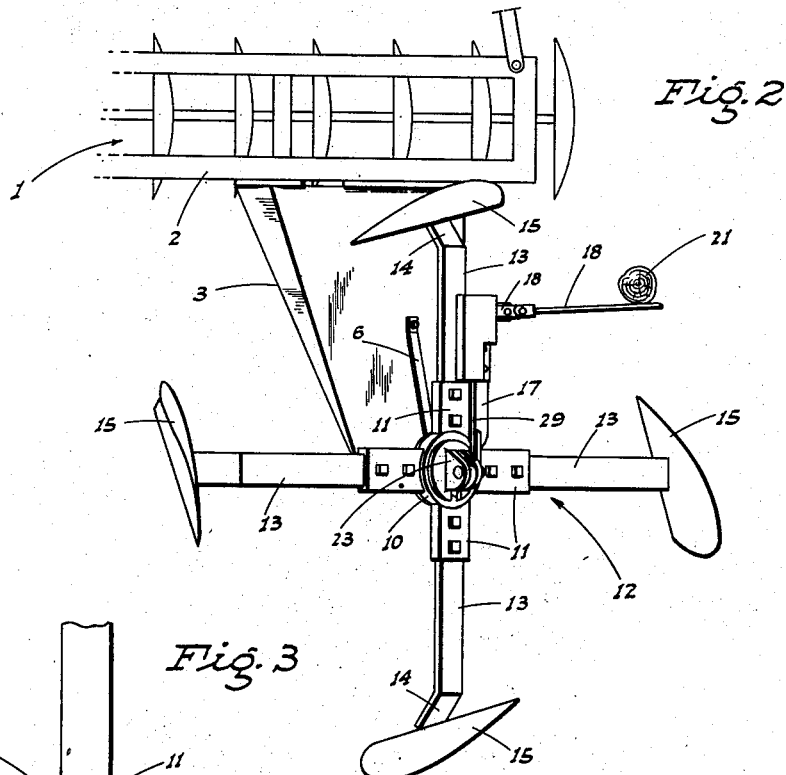
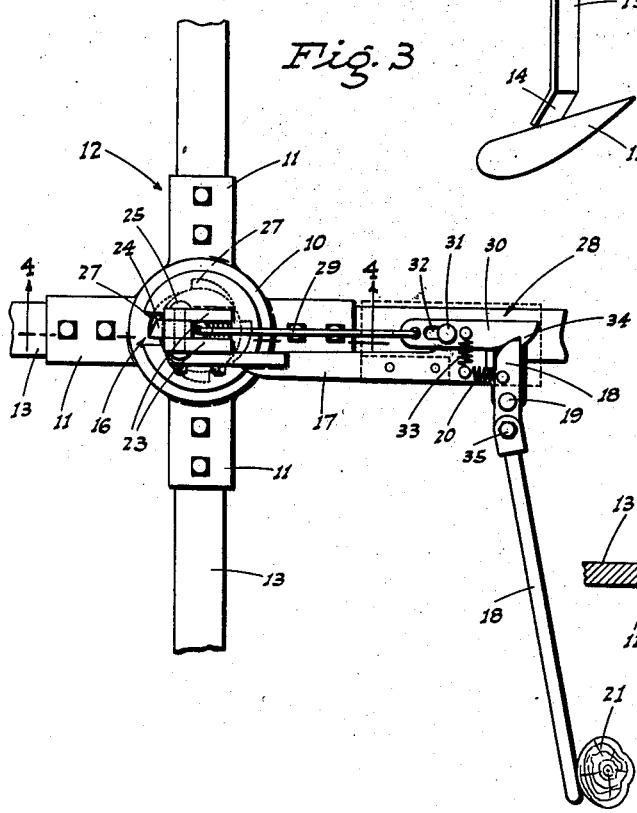
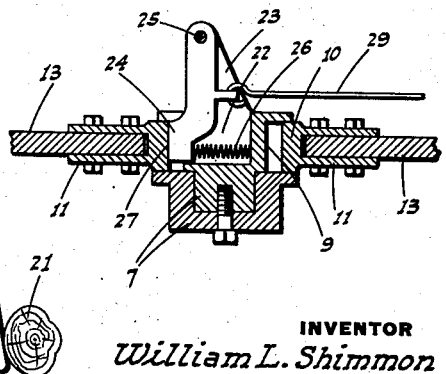
INVENTOR
*William L. Shimmon*

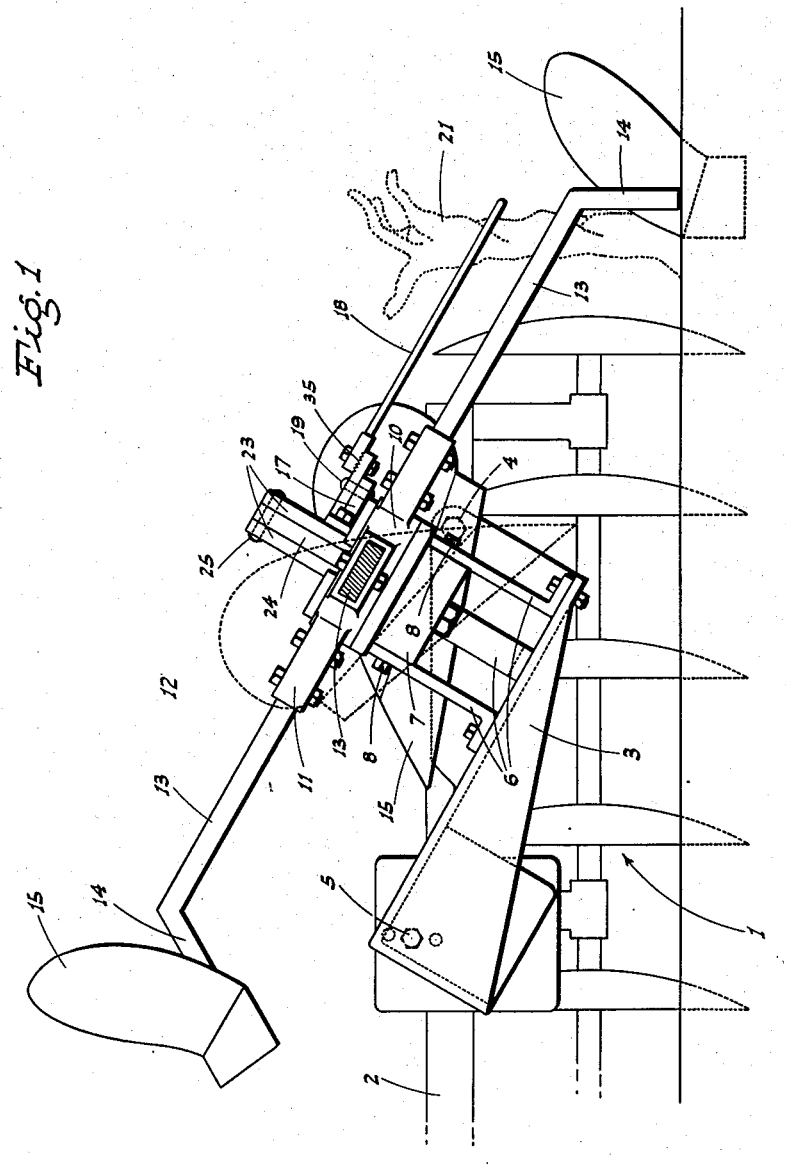

Patented Feb. 9, 1954

2,668,488

UNITED STATES PATENT OFFICE 2,668,488

VINEYARD PLOW

William L. Shimmon, Modesto, Calif.

Application March 14, 1951, Serial No. 215,453

1 Claim. (Cl. 97—46.89)

The present invention is directed to, and it is a major object to provide a vineyard plow of novel construction and function; the plow being adapted to be mounted on a between-row cultivating implement such as a disc harrow, and as so mounted functioning to cultivate the soil in a longitudinal path which extends in direct alinement between the row of vines to one side of said implement.

Another important object of the invention is to provide a vineyard plow which is operative to automatically "skip" at each vine; the plow being so controlled by means which includes a trigger arm which engages each vine trunk as the implement advances.

A further object of the present invention is to provide a vineyard plow, for the purpose described, which embodies a spider-like rotor mounted at a laterally outward and downward slope and having a plow blade on the outer end of each spider arm, with one of said plow blades normally disposed in soil engagement and running in the longitudinal path between adjacent vines; there being trigger controlled latch means to automatically release the rotor for a part-turn as each vine is passed, whereby the rotor—as it part-turns—straddles the trunk of said vine, said one plow blade rising out of the soil immediately to the rear of the trunk and moving to a clearance position, and the next plow blade entering the soil immediately ahead of said trunk. In this manner the plow blades successively work along said longitudinal paths, with the plow blades changing position as each vine is passed and the trunk straddled by a part-turn of the rotor.

An additional object of the invention is to provide a vineyard plow, as above, which is simple but rugged in structure; self-cleaning when in operation; acts smoothly but positively to change-position the plow blades without over-load on the implement; and does not impose wear and tear on the vine trunks.

It is also an object of the invention to provide a vineyard plow which is designed for ease and economy of manufacture.

Still another object of the invention is to provide a practical and reliable vineyard plow, and one which will be exceedingly effective for the purpose for which it is designed.

These objects are accomplished by means of such structure and relative arrangement of parts as will fully appear by a perusal of the following specification and claim.

In the drawings:

Fig. 1 is a rear elevation of the vineyard plow as mounted, for use, in connection with a disc harrow; the rearwardly projecting spider arm being broken off.

Fig. 2 is a top plan view of the plow as in use, with the trigger arm shown at the moment of its engagement with a vine trunk.

Fig. 3 is an enlarged fragmentary plan view of the plow rotor and the releasable latch mechanism associated therewith; the trigger arm here being shown in the same relative position as in Fig. 2.

Fig. 4 is a fragmentary section on line 4—4 of Fig. 3.

Referring now more particularly to the characters of reference on the drawings, the vineyard plow is adapted to be mounted in connection with a between-row cultivating implement, such as a disc harrow 1; the latter including a rigid main frame 2.

An extension frame 3 is secured to the back of the main frame 2 and projects rearwardly therefrom; such extension frame, at the front, being pivoted, as at 4, and vertically adjustably attached, as at 5, at transversely spaced points, to the main frame 2.

The purpose of such adjustment is to alter the inclination of a canted, multiple leg pedestal 6; such pedestal normally extending at a laterally upward and outward incline.

At its upper end the canted multiple leg pedestal 6 is fixed in connection with a two-part body 7 which is circular in plan and is secured to the pedestal legs by bolts 8.

The two-part body 7 is formed, in its upper half, with an annular channel 9 in which a rotary hub 10 is turnably retained; such hub being formed with attachment forks 11 which radiate therefrom 90° apart.

The rotary hub 10 is included in a plow rotor, indicated generally at 12, which rotor includes rotor or spider arms 13, each affixed at its inner end in a corresponding one of the attachment forks 11, whereby said arms radiate from the hub in corresponding relation; to-wit, 90° apart.

At their outer ends each of the rotor or spider arms 13 is down-turned to provide a standard 14, and each standard carries a plow blade 15; such blades being disposed in a working position when the corresponding arm is lowermost.

By reason of its mounting, as above described, the plow rotor 12 is disposed at a laterally outward and downward slope at all times; turning about an axis concentric with that of the two-part circular body 7.

The plow rotor 12 is normally latched to body 7, with one of the plow blades 15 in ground engagement, by means of latch mechanism, indicated generally at 16, which will hereinafter be described in detail.

With advance of the implement 1 between the rows of a vineyard, the plow blade 15 which is in lowermost or soil engaging, working position, runs in a longitudinal path in the soil which extends in direct alinement between adjacent vines.

A radial mounting plate 17 projects forwardly from the body 7, and a trigger arm 18 extends laterally outwardly from said plate 17 adjacent the forward end of the latter; such trigger arm 18 being pivoted adjacent but short of its inner end, as at 19, for rearward swinging motion against the tension of a spring 20.

The trigger arm 18 thus leads, by a short distance, the plow blade 15 which is in lowermost soil engaging, working position, and as said blade approaches the trunk 21 of the next ahead vine, such trigger arm bears against said trunk and is swung rearwardly. As the trigger arm 18 swings rearwardly it trips the latch mechanism 16, whereupon the plow rotor 12 turns a quarter-turn under the influence of ground drag as the implement 1 advances. With such quarter-turn of the plow rotor 12, the plow blade 15 which has been in lowermost soil engaging, working position rises out of the soil to the rear of the trunk 21 and moves to a clearance position, and at the same time the next following plow blade lowers and enters the ground directly ahead of said trunk. Thus, in effect, the plow motor 12 has made a quarter-turn in straddling relation to the trunk 21, withdrawing one plow blade from the rear thereof and replacing the next plow blade ahead thereof.

The result is that there is a substantially full length plowing of the soil in the longitudinal paths directly between adjacent vines, yet without the plow blades disturbing the roots or striking the trunks of said vines.

The latch mechanism 16 which is employed to accomplish automatic control of the plow rotor 12 from the trigger arm 18 comprises the following:

The two-part body 7 is formed, in the top thereof, with a radial slot 22 which extends lengthwise of the radial mounting plate 17, and ears 23 upstand from the body 7 on opposite sides of said slot; the latter opening at one end through the annular channel 9.

A swing latch 24 is pivoted at its upper end, as at 25, between the upstanding ears 23, and such latch is spring-urged in the radial slot 22 toward its open end by a compression spring 26. The lower end portion of the swing latch 24 normally works out of the radial slot 22 into one of four equidistantly spaced notches 27 formed in the inner wall of the rotary hub 10; said notches 27 being shouldered in a direction such that the swing latch 24 normally prevents rotation of the plow rotor 12 under the influence of ground drag from the plow blade 15 which is in lowermost, soil engaging working position.

The numeral 28 indicates generally a latch release unit, which unit comprises a pull rod 29 connected to the swing latch 24 intermediate its ends and extending forwardly to connection with the rear end of a longitudinally slidable, laterally swingable finger 30 which is disposed lengthwise atop the radial mounting plate 17, being secured thereto by a headed pin 31 which projects through a longitudinal slot 32. A tension spring 33 urges the finger 30 laterally outwardly into engagement with the inner end of the trigger arm 18.

At its forward end the finger 30 is formed with a hook 34 which normally engages the inner end of the trigger arm 18.

When the trigger arm 18 swings rearwardly in response to engagement with a vine trunk 21, the inner end of such trigger arm—being engaged by the hook 34—urges the finger 30 forwardly, and the pull rod 29 retracts the swing latch 24 from the notch 27 in which the latter in engaged.

With continued rearward swinging of the trigger arm 18 its inner end escapes the hook 34 and the finger 30 slides rearwardly so that the swing latch 24, which is spring-urged, automatically seats in the next following notch 27, whereby only a quarter-turn of the plow rotor 12 is permitted and the latch mechanism 16 again becomes effective. After the trigger arm 18 escapes the trunk 21 with continued advance of the implement 1, such trigger arm is swung forwardly to its normal position by the spring 20, and the inner end of said trigger arm reengages with the hook 34 by reason of cooperating cam surfaces on the parts, as shown. The latch mechanism 16 and the latch release unit 28 are then ready to again function, in the contemplated manner, upon the next trunk 21 being engaged by the trigger arm 18.

In order to adjust the spacing between the trigger arm 18 and the plow blade 15 which is in lowermost soil engaging, working position, and which spacing controls the timing of release of the latch mechanism 16, the trigger arm 18 is articulated adjacent but outwardly of the pivot 19, and there includes an adjustable connection 35.

Adjustment of the angle of inclination of the plow rotor 12, and consequently of the angle at which the plow blades 15 work in the soil, is accomplished by means of the pivot 4 and the vertically adjustable pivot 5. By adjusting the angle or cant of the rearwardly projecting extension frame 3, a corresponding resetting of the plow rotor 12 with respect to its cant is attained.

The herein described invention provides a very practical and reliable vineyard plow, and one which works automatically upon advance of the implement 1; each of the vine trunks 21 being cleared without injury by the plow blades, yet the latter working effectively to plow the soil in a longitudinal path in direct alinement between adjacent vine trunks.

While the trigger arm 18 does engage the trunk, the resistance to rearward motion of said arm is not great, so that there is no scarring or other damage to the trunk.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claim.

I claim:

A plow comprising a support movable along the ground, a circular body on the support canted laterally, a plow rotor comprising a hub turnable on the body, arms extending radially from the hub and plow blades supported from the outer end of the arms; latch means on the body to prevent rotation of the rotor from any one of a plurality of predetermined positions and including a releasable spring-advanced latch member pivoted on the body for fore and aft movement, a pull unit projecting forwardly from the latch member and connected thereto relative to its pivot so that forward movement of the unit releases the latch member, a trigger arm engageable with a trunk projecting laterally from and operatively connected to the forward end of the pull unit, and a plate rigid with and projecting forward from the body on which the trigger is pivoted intermediate its ends; the pull unit including a finger at its forward end slidably and swivelly mounted on the plate and having a laterally and rearwardly facing notch, and the trigger arm being arranged at its end adjacent the unit to releasably engage the forward end of the notch.

WILLIAM L. SHIMMON.

References Cited in the file of this patent

FOREIGN PATENTS

| Number | Country | Date |
|---|---|---|
| 103,983 | France | July 11, 1874 |
| 370,928 | France | Jan. 7, 1907 |
| 25,893 | France | Feb. 27, 1923 |
| | (Addition to No. 540,107) | |
| 565,703 | France | Nov. 10, 1923 |
| 865,371 | France | Feb. 24, 1941 |
| 956,030 | France | July 4, 1949 |